United States Patent [19]

Winnik et al.

[11] Patent Number: 5,256,193
[45] Date of Patent: * Oct. 26, 1993

[54] PORPHYRIN CHROMOPHORE AND DENDRIMER INK COMPOSITION

[75] Inventors: Francoise M. Winnik, Toronto; Anthony R. Davidson, Agincourt; Marcel P. Breton, Mississauga, all of Canada

[73] Assignee: Xerox Corporation, Stamford, Conn.

[*] Notice: The portion of the term of this patent subsequent to Jun. 9, 2009 has been disclaimed.

[21] Appl. No.: 904,318

[22] Filed: Jun. 25, 1992

[51] Int. Cl.$^5$ .............................................. C09D 11/02
[52] U.S. Cl. ................................ 106/21 A; 106/21 E; 106/23 C; 106/22 C; 106/15.01; 106/17
[58] Field of Search .................. 106/21 A, 19 F-19 R, 106/15.05, 17

[56] References Cited

U.S. PATENT DOCUMENTS

| | | | |
|---|---|---|---|
| 4,705,567 | 11/1987 | Hair et al. | 106/20 |
| 4,877,451 | 10/1989 | Winnik et al. | 106/23 |
| 5,120,361 | 6/1992 | Winnik et al. | 106/22 R |

Primary Examiner—Mark L. Bell
Assistant Examiner—Margaret Einsman
Attorney, Agent, or Firm—E. O. Palazzo

[57] ABSTRACT

An ink composition comprised of a solution comprised of a dye comprised of a porphyrin chromophore and a dendrimer.

18 Claims, No Drawings

PORPHYRIN CHROMOPHORE AND DENDRIMER INK COMPOSITION

BACKGROUND OF THE INVENTION

The present invention is directed to ink compositions and imaging and printing processes thereof. More specifically, in one embodiment the present invention is directed to rapid drying fluorescent ink jet ink compositions useful in the printing of concealed images for security or encoding applications, and wherein the inks contain dyes based on a porphyrin chromophore, or analogous components and a dendrimer, or mixture of dendrimers. The dyes can possess an extremely strong band at 380 to 500 nanometers, the Soret Band of the absorption spectrum, in addition to much weaker bands in the 600 to 800 nanometer range. The dyes also exhibit fluorescence in the 600 to 800 nanometer range, which spectral area is distinct from the emission window characteristic of the optical brighteners used in commercial papers. In one embodiment, the inks of the present invention are comprised of the porphyrin chromophore dye, like tetrapyridiniumporphyrin tetraacetate, an aqueous liquid vehicle optionally containing solvents, and a dendrimer. The inks can be formulated after mixing water, the dendrimer, and the dye by the addition, for example, of a cosolvent comprised of water and a glycol, like diethyleneglycol, thereby improving latency, which is the maximum time period, for example less than one hour, and from about 1 to about 10 minutes, over which an uncapped ink jet printhead can remain idle before noticeable deterioration of its jetting performances, and this addition can improve ink drying time, that is the time needed for an ink jet print to dry to an extent such that it will not smear or offset upon handling or when placed in contact with another sheet of paper, which drying time can, for example, be less than one minute, or more specifically from about 0.2 to about 5 seconds. Also, the addition of glycol permits the adjustment of the ink viscosity from about 1.1 to about 5 centipoise, and preferably from about 1.1 to about 3.0 centipoise, and can permit adjustment of the ink surface tension. Viscosity and surface tensions are major contributing factors in the production of excellent quality prints on plain papers, that is prints with acceptable edge acuity, or the sharpness of the edge between the printed and nonprinted areas, minimal ink feathering on paper, and characterized, for example, by a desirable uniformity of solid area ink coverage. The inks of the present invention can be selected for a number of known ink jet printing methods and apparatus, including thermal ink jet, or bubble jet processes as described in, for example, U.S. Pat. Nos. 4,601,777, 4,251,824, 4,410,899, 4,412,224, and 4,532,530, the disclosures of which are totally incorporated herein by reference. More specifically, the inks of the present invention can be selected to generate invisible images which can be made visible to certain users under special viewing conditions, such as illumination of the image with ultraviolet light. These images can be detected also by sensors, such as detectors of fluorescence.

The fluorescent inks of the present invention are especially useful for the printing of concealed images for security applications, such as printing of documents containing information restricted to a limited readership. The inks of the present invention are also especially useful in processes wherein it is desired to place invisible markings on documents; examples of such situations include providing security markings to control the number of copies made of a document, providing invisible markings that can be detected by an imaging device and that provide instructions to the imaging device, identifying the machine with which the original document was made, or controlling the integrity of a printing job, or monitoring downstream functional operations, or the like. These inks contain in addition to dendrimers a fluorescent dye selected from a number of dyes which are compatible with specific solvent mixtures known to provide inks which dry rapidly, for example from between 0.2 to 5 seconds, when, for example, jetted on office papers. Rapid drying and excellent waterfastness, in embodiments from between 90 to about 99 percent, are of value in rapid printing applications such as printing by xerography at a speed of 50 to 100 copies per minutes, like those related to document tagging. Also, in embodiments the inks of the present invention possess water staining resistance.

Ink jet printing systems can generally be classified by two known types, continuous stream and drop-on-demand. In drop-on-demand systems, a droplet is expelled from an orifice directly to a position on a recording medium in accordance with digital data signals. A droplet is not usually formed or expelled unless it is to be placed on the recording medium. A second type of drop-on-demand system is known as thermal ink jet, or bubble jet. With this type, there are apparently generated high velocity droplets and there is allowed very close spacing of the nozzles. Thermal ink jet processes are well known as indicated herein, and are described, for example, in U.S. Pat. Nos. 4,601,777; 4,251,824; 4,410,899; 4,412,224 and 4,532,530, the disclosures of each of which are totally incorporated herein by reference.

Known ink jet inks generally comprise a water soluble dye which is soluble in an ink vehicle such as water or a mixture comprising water and a water soluble or water miscible organic solvent. Inks comprising soluble dyes may exhibit many problems, such as poor waterfastness, poor lightfastness, clogging of the jetting channels as a result of solvent evaporation and changes in the solubility of the dye, dye crystallization, ink bleeding when prints are formed on plain papers, poor thermal stability, chemical instability, ease of oxidation, and low drop velocity. In addition, many of the dyes contained in inks may be potentially toxic or mutagenic. These problems can be minimized by replacing the dyes used in ink formulations with insoluble pigments. In general, pigments are superior to dyes with respect to waterfastness, lightfastness, image density, thermal stability, oxidative stability, the ability to perform intercolor ink mixing, compatibility with both coated/treated and plain papers, image edge acuity, reduced image feathering, and nontoxic and nonmutagenic properties.

Heterophase ink jet inks are known. For example, U.S. Pat. No. 4,705,567, the disclosure of which is totally incorporated herein by reference, discloses a heterophase ink jet ink composition which comprises water and a dye covalently attached to a component selected from the group consisting of poly(ethylene glycols) and poly(ethylene imines), which component is complexed with a heteropolyanion. In addition, U.S. Pat. No. 4,597,794 discloses an ink jet recording process which comprises forming droplets of an ink and recording on an image receiving material by using the droplets, wherein the ink is prepared by dispersing fine particles of a pigment into an aqueous dispersion medium containing a polymer having both a hydrophilic and a hydrophobic construction portion. The hydrophilic portion constitutes a polymer of monomers having mainly polymerizable vinyl groups into which hydrophilic portions such as carboxylic acid groups, sulfonic acid groups, sulfate groups, and the like are introduced. Pigment particle size may be from several microns to several hundred microns. The ink compositions disclosed may also include additives such as surfactants, salts, resins, and dyes.

U.S. Pat. No. 4,877,451, the disclosure of which is totally incorporated herein by reference, discloses ink jet ink compositions comprising water, a solvent, and a plurality of colored particles comprising hydrophilic porous silica particles to the surfaces of which dyes are covalently bonded through silane coupling agents. In addition, copending application U.S. Ser. No. 07/369,003, the disclosure of which is totally incorporated herein by reference, there are illustrated ink jet inks and liquid developers containing colored particles comprising hydrophilic porous silica particles to the surfaces of which dyes are covalently bonded through silane coupling agents. The ink compositions of this patent are believed to be less stable in the printheads, and less stable during storage, disadvantages avoided, or minimized with the inks of the present invention.

Copending application U.S. Ser. No. 544,564 (now abandoned), the disclosure of which is totally incorporated herein by reference, relates, for example, to ink compositions which comprise an aqueous liquid vehicle and colored particles of an average diameter of 100 nanometers or less which comprise micelles of block copolymers of the formula ABA, wherein A represents a hydrophilic segment and B represents a hydrophobic segment, and wherein dye molecules are covalently attached to the micelles. In a specific embodiment of the copending application, the colored particles comprise micelles of block copolymers of the formula ABA having silica precipitated therein and dye molecules covalently attached to the micelles.

In U.S. Pat. No. 5,120,361, the disclosure of which is totally incorporated herein by reference, there is disclosed an ink composition comprised of a solution comprised of a dendrimer and a dye or dyes, which dyes are visible, or can be seen under normal viewing conditions, and wherein the dendrimer can be a first, second or third generation dendrimer.

U.S. Pat. No. 5,225,900, entitled "Method of Storing Information Within a Reprographic System", with the named inventor Joseph D. Wright, the disclosure of which is totally incorporated herein by reference, discloses apparatuses and processes for controlling a reproduction system by scanning an image to detect at least one taggant in at least one marking material forming the image and issuing instructions to the reproduction system; the instructions cause the reproduction system to take an action selected from the group consisting of (a) prohibiting reproduction of those portions of the image formed by a marking material containing at least one predetermined detected taggant and reproducing all other portions of the image; (b) prohibiting reproduction of any part of the image upon detection of at least one predetermined taggant; (c) reproducing only those portions of the image formed by a marking material containing at least one predetermined taggant; (d) reproducing portions of the image formed by a marking material containing at least one predetermined taggant in a different manner from that in which the system reproduces portions of the image formed by a marking material not containing at least one predetermined taggant; and (e) identifying a source of the image on the basis of detection of at least one predetermined taggant.

In U.S. Pat. No. 5,145,518 there is disclosed an ink composition which comprises an aqueous liquid vehicle and particles of an average diameter of 100 nanometers or less which comprise micelles of block copolymers of the formula ABA, wherein A represents a hydrophilic segment and B represents a hydrophobic segment, and wherein dye molecules are covalently attached to the micelles, said dye molecules being detectable when exposed to radiation outside the visible wavelength range; and in copending application U.S. Ser. No. 834,093 there is disclosed an ink composition comprised of a solution comprised of a dye comprised of a porphyrin chromophore. The disclosures of each of these patents and copending applications are totally incorporated herein by reference.

SUMMARY OF THE INVENTION

It is a object of the present invention to provide ink compositions with many of the advantages illustrated herein.

It is another object of the present invention to provide ink jet compositions with certain dyes and dendrimers.

It is yet another object of the present invention to provide ink compositions with porphyrin chromophores that exhibit extremely strong absorption spectrum bands in the 380 to 500 nanometer range, and much weaker bands in the 500 to 800 nanometer range, and wherein excitation of the 380 to 500 band results in a strong fluorescence in the 600 to 800 nanometer range.

It is still another object of the present invention to provide waterfast ink compositions with a fluorescent dye which emits light in a region of the visible spectrum where there is no interference from the intrinsic paper fluorescence.

Another object of the present invention is to provide rapid drying ink compositions.

It is yet another object of the present invention to provide ink compositions with a fluorescent dye, which emits light in the visible range with no loss of emission intensity due to undesired diffusion of the dye within the paper, resulting in show through.

Yet another object of the present invention is to provide ink compositions that can be prepared by simple and economical processes.

Still another object of the present invention is to provide ink compositions with porphyrin dyes that possess specific photophysical characteristics and a dendrimer, which inks enable the generation of invisible images that cannot be detected by visual observation thereof under normal conditions.

It is another object of the present invention to provide ink compositions suitable for printing on plain papers, coated or treated papers, and transparency materials.

Another object of the present invention is to provide ink compositions with acceptable thermal and storage stability.

Moreover, another object of the present invention is to provide ink compositions suitable for ink jet printing, which inks do not induce, or minimize clogging of the ink printheads.

These and other objects of the present invention can be accomplished in embodiments thereof by providing an ink composition which comprises an aqueous liquid vehicle comprised of certain dyes and dendrimers. In one embodiment, the inks of the present invention are comprised of a solution comprised of a porphyrin type dye and a dendrimer.

Porphyrin type dyes suitable for the inks of the present invention include, for example, 5,10,15,20-tetrakis-(1-methyl-4-pyridyl)-21H,23H-porphine tetra-p-tosylate salt, available form Aldrich Chemical Corporation, 5,10,15,20-tetrakis-(1-methyl-4-pyridyl)-21H,23H-porphine tetrachloride salt, 5,10,15,20-tetrakis-(1-methyl-4-pyridyl)-21H,23H-porphine tetrabromide salt, 5,10,15,20-tetrakis-(1-methyl-4-pyridyl)-21H,23H-porphine tetra-acetate salt, 5,10,15,20-tetrakis-(1-methyl-4-pyridyl)-21H,23H-porphine tetra-perchlorate salt, 5,10,15,20-tetrakis-(1-methyl-4-pyridyl)-21H,23H-porphine tetra-fluoroborate salt, 5,10,15,20-tetrakis-(1-methyl-4-pyridyl)-21H,23H-porphine tetra-perchlorate salt, 5,10,15,20-tetrakis-(1-methyl-4-pyridyl)-21H,23H-porphine tetra-triflate salt, 5,10,15,20-tetrakis-(1-hydroxymethyl-4-pyridyl)-21H,23H-porphine tetra-p-tosylate salt, 5,10,15,20-tetrakis-[1-(2-hydroxyethyl)-4-pyridyl]21H,23H-porphine tetrachloride salt, prepared as described, for example, by V. N. Madakyan, *Chemistry of Heterocyclic Compounds*, 1986, pages 167 to 171, 5,10,15,20-tetrakis-[1-(3-hydroxypropyl)-4-pyridyl]-21H,23H-porphine, tetra-p-tosylate salt, 5,10,15,20-tetrakis-[1-(2-hydroxypropyl)-4-pyridyl]-21H,23H-porphine tetra-p-tosylate salt, 5,10,15,20-tetrakis-[1-(2hydroxyethoxyethyl)-4-pyridyl]-21H,23H-porphine tetra-p-tosylate salt, 5,10,15,20-tetrakis-[1-(2-hydroxyethoxypropyl)-4-pyridyl]-21H,23H-porphine tetra-p-tosylate salt, 5,10,15,20-tetrakis-[4-(trimethylammonio)phenyl]-21H,23H-porphine tetra-p-tosylate salt, available from Aldrich Chemical Corporation, 5,10,15,20-tetrakis-[4-(trimethylammonio)phenyl]-21H,23H-porphine tetrachloride salt, 5,10,15,20-tetrakis-[4-(trimethylammonio)phenyl]-21H,23H-porphine tetrabomide salt, 5,10,15,20-tetrakis-[4-(trimethylammonio)phenyl]-21H,23H-porphine tetra-acetate salt, 5,10,15,20-tetrakis-[4-(trimethylammonio)phenyl]-21H,23H-porphine tetra-perchlorate salt, 5,10,15,20-tetrakis-[4-(trimethylammonio)phenyl]-21H,23H-porphine tetrafluoroborate salt, 5,10,15,20-tetrakis-[4-(trimethylammonio)phenyl]-21H,23H-porphine tetra-triflate salt, meso-(N-methyl-X-pyridinium)n-(phenyl)4-n-21H,23H-porphine tetra-p-tosylate salt, where n is an integer of value 0, 1, 2, or 3, and where X=4-(para), 3-(meta), or 2-(ortho) refers to the position of the nitrogen in the pyridinium substituent, prepared as described, for example, by M. A. Sari et al. in *Biochemistry*, 1990, 29, 4205 to 4215; meso-tetrakis-[o-(N-methylnicotinamido)phenyl]-21H,23H-porphine tetramethyl sulfonate salt, prepared as described, for example, by G. M. Miskelly et al. in *Inorganic Chemistry*, 1988, 27, 3773 to 3781; 5,10,15,20-tetrakis-(2-sulfonatoethyl-4-pyridyl)-21H,23H-porphine chloride salt, prepared as described by S. Igarashi and T. Yotsuyanagi in *Chemistry Letters*, 1984, 1871; 5,10,15,20-tetrakis-(carboxymethyl-4-pyridyl)-21H,23H-porphine chloride salt, 5,10,15,20-tetrakis-(carboxyethyl-4-pyridyl)-4-pyridyl)-21H,23H-porphine chloride salt, 5,10,15,20-tetrakis-(carboxyethyl-4-pyridyl)-21H,23H-porphine bromide salt, 5,10,15,20-tetrakis-(carboxylate-4-pyridyl)-21H,23H-porphine bromide salt, prepared as described by D. P. Arnold in *Australian Journal of Chemistry*, 1989, 42, 2265 to 2274; 2,3,7,8,12,13,17,18-octa-(2-hydroxyethyl)-21H,23H-porphine, 2,3,7,8,12,13,17,18-octa-(2-hydroxyethoxyethyl)-21H-23H-porphine, 2,3,7,8,12,13,17,18-octa-(2-aminoethyl)-21H-23H-porphine, 2,3,7,8,12,13,17,18-octa-(2-hydroxyethoxypropyl)-21H-23H-porphine, and the like. These dyes are available, and also many of them can be prepared by known means such as by following the general synthesis described in *Organic Synthesis*, A. I. Meyers, Editor, Volumes 70, 68 to 72 (1991) and the references included therein, the disclosures of which are totally incorporated herein by reference.

The liquid vehicle of the inks of the present invention can be comprised of various known components, such as water, a mixture of water and a miscible organic component, such as a glycol, like ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, dimethylsulfoxide, sulfolane, alcohol derivatives, carbitol, butyl carbitol, cellusolve, ether derivatives, amino alcohols, ketones; biocides; other water miscible materials, mixtures thereof; and the like. When mixtures of water and water miscible organic liquids, such as glycols, are selected as the liquid vehicle, the water to organic ratio may be in any effective range, and typically is from about 100:0 to about 30:70, and preferably from about 97:3 to about 50:50. The nonwater or organic component of the liquid vehicle generally serves as a humectant which has a boiling point higher than that of water (100° C.). The ink liquid vehicle components, that is for example the water and the humectants, generally possess absorption characteristics on paper and evaporation properties allowing for the desired ink jet printing speed when the ink is to be used in an ink jet printing process. With the inks of the present invention in embodiments, the liquid vehicle can be present in an amount of from about 85 to about 99.5 percent by weight, and preferably from about 90 to about 99 percent by weight.

Optional additives can also be present in the inks of the present invention as indicated herein. For example, one or more surfactants or wetting or dispersing agents can be added to the ink. These additives may be of the cationic, anionic, amphoteric, or nonionic types. Suitable surfactants and wetting or dispersing agents include TAMOL® SN, TAMOL® LG, those of the TRITON® series available from Rohm and Haas Company, those of the MARASPERSE® series, those of the IGEPAL® series available from GAF Company, those of the TERGITOL® series, STRODEX PK-90 ™ available from GAF, PLURONIC F-68 ™, available from BASF, KARASPERSE TU ™, available from Marasperse, and other commercially available surfactants. These surfactants and wetting agents are present in any effective amounts, generally from 0 to about 15 percent by weight, and preferably from about 0.01 to about 8 percent by weight.

Polymeric additives or dispersants in effective amounts of, for example, 1 to about 15 weight percent for enhancing the viscosity of the ink can also be added to the inks of the present invention. Examples include water soluble polymers such as gum arabic, polyacrylate salts, polymethacrylate salts, polyvinyl alcohols, hydroxypropylcellulose, hydroxyethylcellulose, polyvinylpyrrolidinone, polyvinylether, starch, polysaccharides, sodium salt of naphthalene sulfonate formaldehyde copolymer, sodium salt of alkylbenzene sulfonate, sodium salt of dialkylsulfosuccinate, sodium salt of lignosulfonate, sodium alkylene oxide copolymer, sodium salt of alkyletherphosphate, and the like. In addition, polymers such as hydroxypropylpolyethyleneimine (HPPEI-200) or other polyethyleneimine derivatives can be added to the ink. Polymeric stabilizers can be present in the ink of the present invention in any effective amounts, typically from 0 to about 10 percent by weight, and preferably from about 0.01 to about 5 percent by weight.

Other optional additives for improving the jetting characteristics and the storage stability of the inks and for preventing undesirable interactions of the inks with the printhead either during the jetting process or while the printer is idle for the inks of the present invention as illustrated herein, include humectants such as ethylene glycol, diethylene glycol, N-methylpyrrolidinone, propylene glycol, hydroxyethers, ethers, amides, sulfoxides, ketones, lactones, esters, alcohols, and the like, present in an amount of from 0 to about 50 percent by weight, and preferably from about 5 to about 40 percent by weight; biocides like DOWICIL TM 75, 150, and 200, benzoate salts, sorbate salts, and the like, present in an effective amount of, for example, from about 0.0001 to about 4 percent by weight, and preferably from about 0.01 to about 2.0 percent by weight; and pH controlling agents such as acids or, bases, phosphate salts, carboxylate salts, sulfite salts, amine salts, and the like, present in an amount of from 0 to about 5 percent by weight and preferably from about 0.01 to about 2 percent by weight, bases, present in an amount of from 0 to about 10 percent by weight and preferably from about 4 to about 8 percent by weight, or the like.

Dendrimers can be considered radially symmetrical molecules of a STARBURST TM topology comprised of an initiator core, such as nitrogen, ethylenediimine, and the like, interior layers attached to the core and comprised of, for example, three or four arms, each arm being composed of repeating units with the number of repeating units in each arm being considered the generation of the dendrimer, and terminal functional groups functionality, such as, for example, a primary amine attached to the outermost generation, which dendrimers are illustrated, for example, in U.S. Pat. Nos. 4,507,466; 4,631,337; 4,558,120; 4,568,737 and 4,587,329; and in D. A. Tomalia, A. M. Naylor, and W. A. Goddard III, *Angewandte Chemie, Int.* Ed. Engl. 29, 138 (1990), the disclosures of which are totally incorporated herein by reference. The size and shape of the STARBURST TM dendrimer molecule and the functional groups present in the dendrimer molecule can be controlled by the choice of the initiator core, the number of generations, and the choice of repeating units employed at each generation. The choice of the dendrimer components can affect the properties of the dendrimers. The initiator core type can affect the dendrimer shape producing, for example, spheroid-shaped dendrimers, cylindrical- or rod-shaped dendrimers, or ellipsoid-shaped dendrimers. Sequential building of generations determines the dimensions of the dendrimers and the nature of its interior. Examples of suitable core materials include ammonia, polyfunctional alcohols, such as pentaerythritol or tris-(hydroxymethyl)ethane, 1,1,1-tris-(4'-hydroxyphenyl)-ethane, polyfunctional amines, such as ethylene diamine, linear polyethyleneimines, and the like. The chemical functionality of the repeating unit in the interior layers can include, for example, amidoamines, such as aminoethyl acetamide, imines, such as diethylene diimine, or ethers like those obtained from materials such as, for example, 3,5-dihydroxyethyl benzyl alcohol. The terminal functionalities include, for example, amino groups, hydroxyl groups, carboxylic acid groups, carboxylates, esters, amides, phosphates, sulfonates, and the like. The synthesis of dendrimers usually occurs by a divergent approach that involves the initial reaction of a monomer with the initiator core, followed by exhaustive reaction of the resulting functional groups with a difunctional compound, such as a diamine, including, for example, ethylene diamine, to afford the next generation of reactive amino groups. Repetition of the two-step procedure leads to subsequent generations. An alternate synthetic route uses a convergent growth synthesis as described in detail in C. J. Hawker and J. M. J. Fréchet, *J. Am. Chem. Soc.*, 112, 7638 (1990), the disclosure of which is totally incorporated herein by reference. Examples of dendrimers prepared by the divergent approach include the STARBURST TM available from Polysciences, Inc., in which the terminal functional groups are primary amino groups, and which range in average diameter of from about 10.8 Angstroms (first generation) to about 83.9 Angstroms (8th generation).

Dendrimer examples as illustrated herein, such as STARBURST TM, are generally present in an effective amount such as a concentration of from about 0.05 percent by weight to about 10 percent by weight, and preferably from about 1 percent by weight to about 5 percent by weight, and, admixed with water, preferably water that has been distilled or deionized, to obtain a clear solution.

Ink compositions of the present invention are suitable for use in ink jet printing processes such as continuous stream, piezoelectric drop-on-demand, bubble jet or thermal ink jet processes. Generally, the process comprises incorporating an ink of the present invention into an ink jet printing apparatus and causing droplets of the ink to be ejected in an imagewise pattern onto a suitable substrate, thereby generating images on the substrate. Various known ink jet apparatus may be employed to generate images with the ink compositions disclosed herein, such as the DIABLO C150 IJ TM printer, Hewlett Packard DESK JET TM printers, the DIABLO C150 TIJ TM printer, or the like. Particularly preferred is a thermal ink jet printing apparatus. The inks of the present invention can be used to form images on a wide variety of substrates, including plain paper such as Xerox 4024 paper, bond paper such as GILBERT ® 25 percent cotton bond paper or GILBERT ® 100 percent cotton bond paper, silica coated papers, transparency materials, fabrics, plastics, polymeric films, and the like.

The inks of the present invention in embodiments are usually slightly yellow to tan in color in many embodiments, and can enable printed documents wherein the dye thereof comprised of a porphyrin chromophore can function as a taggant and is detectable under special viewing conditions. The inks of the present invention are useful in processes wherein it is desired to place invisible markings on documents; examples of such situations include providing security markings to control the number of copies made of a document, providing invisible markings that can be detected by an imaging device and that provide instructions to the imaging device (such as instructions not to copy certain portions of the document or to alter the color of certain portions of the document), identifying the machine with which the original document was made, or the like. Examples of apparatuses, or machines and certain inks thereof that may be selected are disclosed in U.S. Pat. No. 5,225,900, the disclosure of which is totally incorporated herein by reference. Further, inks that are colorless in the visible wavelength range and contain two or more different dyes that are detectable in other wavelength regions are useful in processes using one or several different sensors.

Embodiments of the present invention include an ink composition comprised of a solution comprised of a dye comprised of a porphyrin chromophore, and authentication processes thereof, such as a process for printing concealed images detectable by fluorescence which comprises illuminating the image with a light source emitting between 300 nanometers and 450 nanometers, and detecting the light emitted by the image with a sensor sensitive in the 500 to 800 nanometers spectral range.

The ink compositions of the present invention can be prepared by various suitable processes. Typically, the inks are prepared by simple mixing of the ingredients. One process embodiment entails mixing all of the ink ingredients together and filtering the mixture to obtain an ink. Optionally, the mixture obtained after mixing all the ingredients can be heated to a temperature of from about 40° C. to about 55° C. for a period of from about 2 to about 3 hours, subsequently cooling the mixture to room temperature (typically from about 10° to about 35° C.) and filtering the mixture to obtain an ink. More specifically, the inks of the present invention can be prepared by (1) adding a solution in water of the dye to a magnetically stirred solution in water of a dendrimer, a humectant and a biocide resulting in a solution containing a dye in an amount of from about 0.0005 to about 0.01 percent by weight and preferably from about 0.001 to about 0.008 percent by weight, a dendrimer in an amount of from about 0.01 to 15 percent by weight, and preferably from about 0.1 to about 2 percent by weight, a humectant in an amount of from about 0 to about 70 percent by weight, and preferably from about 3 to about 50 percent by weight, a biocide in an amount of from about 0.0001 to about 4 percent by weight and preferably from about 0.01 to about 2 percent by weight, and water from about 29.5 to 99.5 percent by weight and preferably from about 49.5 to about 96.5 percent by weight, this solution being kept at a temperature ranging from 10° to 30° C., and preferably from 20° to 25° C.; (2) stirring the resulting mixture at a temperature ranging from 20° to 25° C. for a period of 2 to 24 hours, and preferably 10 to 15 hours; optionally the mixture can be heated to a temperature ranging from 30° to 60° C. for a period of time ranging from 30 minutes to 2 hours; (3) filtering the resulting mixture through a 0.45 micron filter; and (4) adjusting the ink pH, measured with an Omega pH-meter, to a value ranging from 6.5 to 10.5 by dropwise addition of an aqueous solution of an acid, such as for example hydrochloric acid or acetic acid.

Specific embodiments of the invention will now be described in detail. These examples are intended to be illustrative, and the invention is not limited to the materials, conditions, or process parameters set forth in these embodiments. All parts and percentages are by weight unless otherwise indicated. Examples with control inks are also provided.

EXAMPLE I

There was prepared an ink composition as follows: A stock solution was prepared by combining at room temperature, about 25° C. throughout, 5.0 grams of cyclohexylpyrrolidinone, obtained from Aldrich Chemical Corporation, 21.0 grams of butyl carbitol, obtained from Aldrich Chemical Corporation, 14.0 grams of glycerol, obtained from Aldrich Chemical Corporation, 0.08 gram of polyethylene oxide, $M_w$ 18,500, obtained from Polysciences, 128 milligrams of DOWICIL 200 TM, obtained from Dow Corporation and 195.52 grams of deionized water. This solution was stirred with a magnetic stirrer for 3 hours. To 33.0 grams of the aforementioned solution were added 1.104 milliliters of a 10 percent by weight solution in water of a STARBURST TM dendrimer of the first generation obtained from the Michigan Molecular Institute and 0.87 milliliter of a solution of 5,10,15,20-tetrakis-(1-methyl-4-pyridyl)-21H,23H-porphine tetra-p-tosylate salt, 6.1 milligrams, obtained from Aldrich Chemical Corporation, dissolved in 10 milliliters of water. The mixture was filtered through a 0.45 micron filter. There resulted a tan colored ink comprised of 0.005 percent by weight of the porphyrin dye, 0.3 percent by weight of dendrimer, 83.7 percent by weight of water, 8.4 percent by weight of butyl carbitol, 5.6 percent by weight of glycerol, 2 percent by weight of cyclohexylpyrrolidinone, 0.032 percent by weight of polyethylene oxide, and 0.05 percent by weight of DOWICIL TM. The ink thus prepared was incorporated in a DESK JET TM Hewlett Packard ink jet printer. Prints were formed on a Xerox 4024 paper obtained from Xerox Corporation and on a Sanyo Kokusaku FX-L paper obtained from Fuji Xerox Corporation of Japan. In each instance no patterns could be detected on the prints under normal viewing conditions. The optical density of a printed solid area measured with a Macbeth TR927 Densitometer was 0.02. Illumination at a wavelength of 418 nanometers of the prints placed in the sample compartment of a Fluorolog 212 fluorescence spectrometer, available from SPEX Industries, resulted in a strong fluorescence emission characterized by two bands with maxima at 648 nanometers and 714 nanometers. Excellent contrast was achieved on both papers; the ratio of the fluorescence intensity at 648 nanometers of a printed area to the fluorescence intensity at 648 nanometers of the blank paper was 10 with Xerox 4024 paper and 11.7 with the Sanyo Kokusaku FX-L paper. The prints exhibited a waterfastness of 85.6 percent (0.83 divided by 0.97 multiplied by 100) as determined by cutting a printed solid area on Xerox 4024 paper (wire side) into two sheets, soaking one sheet in water for 2 minutes, air drying the soaked sheets for 24 hours at ambient temperature, and measuring the fluorescence intensities of both the soaked and unsoaked sheets illuminated under identical conditions.

EXAMPLE II

There was prepared a control ink as follows: A stock solution was prepared by combining at room temperature, about 25° C., 5.0 grams of cyclohexylpyrrolidinone, obtained from Aldrich Chemical Corporation, 21.0 grams of butyl carbitol, obtained from Aldrich Chemical Corporation, 14.0 grams of glycerol, obtained from Aldrich Chemical Corporation, 0.08 gram of polyethylene oxide, $M_w$ 18,500, obtained from Polysciences, 128 milligrams of DOWICIL 200 TM, obtained from Dow Corporation and 195.52 grams of deoinized water. This solution was stirred with a magnetic stirrer for 3 hours. To 33.0 grams of the aforementioned solution were added 1.104 milliliters of water and 0.87 milliliter of a solution of 5,10,15,20-tetrakis-(1-methyl-4-pyridyl)-21H,23H-porphine tetra-p-tosylate salt, 6.1 milligrams, obtained from Aldrich Chemical Corporation, dissolved in 10 milligrams of water. The mixture was filtered through a 0.45 micron filter. The composition of this ink was substantially identical to that of the ink described in Example I, except that it did not contain a dendrimer. The physical characteristics of this ink were substantially identical to those of the ink described in Example I with respect to viscosity and surface tension values, however, the waterfastness value is lower as illustrated herein in embodiments. The ink prepared was incorporated in a DESK JET ™ Hewlett Packard ink jet printer. Prints were formed on a Xerox 4024 paper obtained from Xerox Corporation and on a Sanyo Kokusaku FX-L paper obtained from Fuji Xerox Corporation of Japan. In each instance, no patterns could be detected on the prints under normal viewing conditions. The optical density of a printed solid area measured with a Macbeth TR927 Densitometer was 0.03. Illumination at a wavelength of 418 nanometers of the prints placed in the sample compartment of a Fluorolog 212 fluorescence spectrometer available from SPEX Industries resulted in a strong fluorescence emission characterized by two bands with maxima at 648 nanometers and 714 nanometers. Excellent contrast was achieved on both papers; the ratio of the fluorescence intensity at 648 nanometers of a printed area to the fluorescence intensity at 648 nanometers of the blank paper was 10 with Xerox 4024 paper and 11.7 with the Sanyo Kokusaku FX-L paper. The prints exhibited a waterfastness of 35.7 percent (0.34 divided by 0.95 multiplied by 100) as determined by cutting a printed solid area on Xerox 4024 paper (wire side) into two sheets, soaking one sheet in water for 2 minutes, air drying the soaked sheets for 24 hours at ambient temperature, and measuring the fluorescence intensities of both the soaked and unsoaked sheets illuminated under identical conditions.

EXAMPLE III

There was prepared an ink composition as follows: A stock solution was prepared by combining at room temperature, about 25° C., 5.0 grams of cyclohexylpyrrolidinone, obtained from Aldrich Chemical Corporation, 21.0 grams of butyl carbitol, obtained from Aldrich Chemical Corporation, 14.0 grams of glycerol, obtained from Aldrich Chemical Corporation, 0.08 gram of polyethylene oxide, $M_w$ 18,500, obtained from Polysciences, 128 milligrams of DOWICIL 200 ™, obtained from Dow Corporation, and 195.52 grams of deionized water. This solution was stirred with a magnetic stirrer for 3 hours. To 33.0 grams of the aforementioned solution were added 1.104 milliliters of a 10 percent by weight solution in water of a STARBURST ™ dendrimer of the first generation obtained from the Michigan Molecular Institute and 0.87 milliliter of a solution of 5,10,15,20-tetrakis-(4-trimethylaminophenyl)21H,23H-porphine tetra-p-tosylate salt, 5.9 milligrams, obtained from Aldrich Chemical Corporation, dissolved in 10 milliliters of water. The mixture was filtered through a 0.45 micron filter. There resulted a tan colored ink comprised of 0.005 percent by weight of the porphyrin dye, 0.3 percent by weight of a STARBURST ™ dendrimer of the first generation obtained from the Michigan Molecular Institute, 83.7 percent by weight of water, 8.4 percent by weight of butyl carbitol, 5.6 percent by weight of glycerol, 2 percent by weight of cyclohexylpyrrolidinone, 0.032 percent by weight of polyethylene oxide, and 0.05 percent by weight of DOWICIL ™. The ink thus prepared was incorporated in a DESK JET ™ Hewlett Packard ink jet printer. Prints were then generated, or formed on a Xerox 4024 paper obtained from Xerox Corporation and on a Sanyo Kokusaku FX-L paper obtained from Fuji Xerox Corporation of Japan. In each instance no patterns could be detected on the prints under normal viewing conditions. The optical density of a printed solid area measured with a Macbeth TR927 Densitometer was 0.03. Illumination at a wavelength of 418 nanometers of the prints placed in the sample compartment of a Fluorolog 212 fluorescence spectrometer available from SPEX Industries resulted in a strong fluorescence emission characterized by two bands with maxima at 650 nanometers and 715 nanometers. Excellent contrast was achieved on both papers: the ratio of the fluorescence intensity at 648 nanometers of a printed area to the fluorescence intensity at 648 nanometers of the blank paper was 9 with Xerox 4024 paper and 11.2 with the Sanyo Kokusaku FX-L paper. The prints exhibited a waterfastness of 88.4 percent (0.84 divided by 0.95 multiplied by 100) as determined by cutting a printed solid area on Xerox 4024 paper (wire side) into two sheets, soaking one sheet in water for 2 minutes, air drying the soaked sheets for 24 hours at ambient temperature, and measuring the fluorescence intensities of both the soaked and unsoaked sheets illuminated under identical conditions.

EXAMPLE IV

PREPARATION OF A PORPHYRIN DYE

The porphyrin dye 5,10,15,20-tetrakis-(2-hydroxyethyl-4-pyridyl)-21H,23H-porphine chloride salt was prepared as follows: 2.0 grams of 5,10,15,20-tetrakis-(pyridyl)-21H,23H-porphine obtained from Aldrich Chemical Company were added to 100 milliliters of 2-chloroethanol placed in a 200 milliliters round-bottom flask equipped with a reflux condenser and a magnetic stirrer. The mixture was heated at reflux for 5 hours. The solvent was removed by vacuum distillation of the cooled reaction mixture. The dry residue was washed with 500 milliliters of diethyl ether. It was isolated by filtration and recrystallized from 750 milliliters of a mixture of 10 percent by weight of water and 90 percent by weight of propanol. The purified product (2.47 grams, 83 percent yield) was a purple-brown solid. The visible absorption spectrum (IR) of this material in water presented a strong band centered at 420 nanometers and two weak bands centered at 516 nanometers and 584 nanometers.

EXAMPLE V

INK PREPARATION

There was prepared an ink as follows: A stock solution was prepared by combining at room temperature, about 25° C., 5.00 grams of cyclohexylpyrrolidinone, obtained from Aldrich Chemical Corporation, 21.0 grams of butyl carbitol, obtained from Aldrich Chemical Corporation, 14.0 grams of glycerol, obtained from Aldrich Chemical Corporation, 0.08 gram of polyethylene oxide, $M_w$ 18,500, obtained from Polysciences, 128 milligrams of DOWICIL 200 ™, obtained from Dow Corporation, and 195.52 grams of deionized water. This solution was stirred with a magnetic stirrer for 3 hours. To 9.0 grams of the aformentioned solution were added 0.08 milliliter of a 10 percent by weight solution in water of a STARBURST ™ dendrimer of the first generation, obtained from the Michigan Molecular Institute, and 0.11 milliliter of a solution of 5,10,15,20-tetrakis-(2-hydroxyethyl-4-pyridyl)-21H,23H-porphine tetrachloride salt, 4.46 milligrams, prepared as described above, dissolved in 2 milliliters of water. The mixture was filtered through a 0.45 micron filter. There resulted a tan colored ink comprised of 0.005 percent by weight of the porphyrin dye, 0.3 percent by weight of dendrimer, 84 percent by weight of water, 8.4 percent by weight of butyl carbitol, 5.6 percent by weight of glycerol, 2 percent by weight of cyclohexylpyrrolidinone, 0.032 percent by weight of polyethylene oxide, and 0.05 percent by weight of DOWICIL ™. The ink thus prepared was incorporated in a DESK JET ™ Hewlett Packard ink jet printer. Prints were formed on a Xerox 4024 paper obtained from Xerox Corporation and on a Sanyo Kokusaku FX-L paper obtained from Fuji Xerox Corporation of Japan. In each instance no patterns could be detected on the prints under normal viewing conditions. The optical density of a printed solid area measured with a Macbeth TR927 Densitometer was 0.03. Illumination at a wavelength of 418 nanometers of the prints placed in the sample compartment of a Fluorolog 212 fluorescence spectrometer from SPEX Industries resulted in a strong fluorescence emission characterized by two bands with maxima at 654 nanometers and 717 nanometers. Excellent contrast was achieved on both papers; the ratio of the fluorescence intensity at 654 nanometers of a printed area to the fluorescence intensity at 654 nanometers of the blank paper was 10.2 in prints made on Xerox 4024 paper and 12 in prints made of Sanyo Kokusaku FX-L paper. The prints exhibited a waterfastness of 94.8 percent (0.93 divided by 0.98 multiplied by 100) as determined by cutting a printed solid area on Xerox 4024 paper (wire side) into two sheets, soaking one sheet in water for 2 minutes, air drying the soaked sheets for 24 hours at ambient temperature, and measuring the fluorescence intensities of both the soaked and unsoaked sheets illuminated under identical conditions.

EXAMPLE VI

There was prepared an ink composition as follows: A stock solution was prepared by combining at room temperature, about 25° C., 5.0 grams of cyclohexylpyrrolidinone, obtained from Aldrich Chemical Corporation, 21.0 grams of butyl carbitol, obtained from Aldrich Chemical Corporation, 14.0 grams of glycerol, obtained from Aldrich Chemical Corporation, 0.08 gram of polyethylene oxide, $M_w$ 18,500, obtained from Polysciences, 128 milligrams of DOWICIL 200 ™, obtained from Dow Corporation and 195.52 grams of deionized water. This solution was stirred with a magnetic stirrer for 3 hours. To 33.0 grams of the aforementioned solution were added 1.104 milliliters of a 10 percent by weight solution in water of a STARBURST ™ dendrimer of the third generation obtained from the Michigan Molecular Institute and 0.87 milliliter of a solution of 5,10,15,20-tetrakis-(1-methyl-4-pyridyl)-21H,23H-porphine tetra-p-tosylate salt, 6.1 milligrams, obtained from Aldrich Chemical Corporation, dissolved in 10 milliliters of water. The mixture was filtered through a 0.45 micron filter. There resulted a tan colored ink comprised of 0.005 percent by weight of the porphyrin dye, 0.3 percent by weight of dendrimer, 83.7 percent by weight of glycerol, 2 percent by weight of cyclohexylpyrrolidinone, 0.032 percent by weight of polyethylene oxide, and 0.05 percent by weight of DOWICIL ™. The ink thus prepared was incorporated in a DESK JET ™ Hewlett Packard ink jet printer. Prints were formed on a Xerox 4024 paper obtained from Xerox Corporation and on a Sanyo Kokusaku FX-L paper obtained from Fuji Xerox Corporation of Japan. In each instance, no patterns could be detected on the prints under normal viewing conditions. The optical density of a printed solid area measured with a Macbeth TR927 Densitometer was 0.01. Illumination at a wavelength of 418 nanometers of the prints placed in the sample compartment of a Fluorolog 212 fluorescence spectrometer available from SPEX Industries resulted in a strong fluorescence emission characterized by two bands with maxima at 648 nanometers and 714 nanometers. Excellent contrast was achieved on both papers; the ratio of the fluorescence intensity at 648 nanometers of a printed area to the fluorescence intensity at 648 nanometers of the blank paper was 10 with Xerox 4024 paper and 11.7 with the Sanyo Kokusaku FX-L paper. The print exhibited a waterfastness of 92.7 percent (0.89 divided by 0.96 multiplied by 100), as determined by cutting a printed solid area on Xerox 4024 ® paper (wire side) into two sheets, soaking one sheet in water for 2 minutes, air drying the soaked sheets for 24 hours at ambient temperature, about 25° C. throughout, and measuring the fluorescence intensities of both the soaked and unsoaked sheets illuminated under identical conditions.

Other embodiments and modifications of the present invention may occur to those skilled in the art subsequent to a review of the information presented herein; these embodiments and modifications, as well as equivalents thereof, are also included within the scope of this invention.

What is claimed is:

1. An ink composition comprised of a solution comprised of a dye comprised of a porphyrin chromophore and a dendrimer; and wherein the solution contains a liquid vehicle present in an amount of from about 85 to about 99.5 percent by weight, the dye is present in an amount of from about 0.0005 to about 1.0 weight percent, and the dendrimer is present in an amount of from about 0.05 to about 10 weight percent.

2. An ink in accordance with claim 1 wherein the solution contains water.

3. An ink in accordance with claim 1 wherein the solution contains water, a humectant, and a biocide.

4. An ink in accordance with claim 1 wherein the dye is 5,10,15,20-tetrakis-(1-methyl-4-pyridyl)-21H,23H-porphine tetraacetate salt.

5. An ink in accordance with claim 1 wherein the dye is selected from the group consisting of 5,10,15,20-tetrakis-(1-methyl-4-pyridyl)-21H,23H-porphine tetra-p-tosylate, 5,10,15,20-tetrakis-(1-methyl-4-pyridyl)-21H,23H-porphine tetrachloride, 5,10,15,20-tetrakis-(1-methyl-4-pyridyl)-21H,23H-porphine tetrabromide, 5,10,15,20-tetrakis-(1-methyl-4-pyridyl)-21H,23H-porphine tetra-acetate, 5,10,15,20-tetrakis-(1-methyl-4-pyridyl)-21H,23H-porphine tetra-perchlorate, 5,10,15,20-tetrakis-(1-methyl-4-pyridyl)-21H,23H-porphine tetra-fluoroborate, 5,10,15,20-tetrakis-(1-methyl-4-pyridyl)-21H,23H-porphine tetra-perchlorate, 5,10,15,20-tetrakis-(1-methyl-4-pyridyl)-21H,23H-porphine tetra-triflate, 5,10,15,20-tetrakis-(1-hydroxymethyl-4-pyridyl)-21H,23H-porphine tetra-p-tosylate, 5,10,15,20-tetrakis-[1-(2-hydroxyethyl)-4-pyridyl]-21H,23H-porphine tetrachloride, 5,10,15,20-tetrakis-[1-(3-hydroxypropyl)-4-pyridyl]-21H,23H-porphinetetra-p-tosylate, 5,10,15,20-tetrakis-[1-(2-hydroxypropyl)-4-pyridyl]-21H,23H-porphine tetra-p-tosylate, 5,10,15,20-tetrakis-[1-(2-hydroxyethoxyethyl)-4-pyridyl]-21H,23H-porphine tetra-p-tosylate, 5,10,15,20-tetrakis-[1-(2-hydroxyethoxypropyl)-4-pyridyl]-21H,23H-porphine tetra-p-tosylate, 5,10,15,20-tetrakis-[4-(trimethylammonio)phenyl]-21H,23H-porphine tetra-p-tosylate, 5,10,15,20-tetrakis-[4-(trimethylammonio)phenyl]-21H,23H-porphine tetrachloride, 5,10,15,20-tetrakis-[4-(trimethylammonio)phenyl]-21H,23H-porphine tetrabromide, 5,10,15,20-tetrakis-[4-(trimethylammonio)phenyl]-21H,23H-porphine tetra-acetate, 5,10,15,20-tetrakis-[4-(trimethylammonio)phenyl]-21H,23H-porphine tetraperchlorate, 5,10,15,20-tetrakis-[4-(trimethylammonio)phenyl]-21H,23H-porphine tetra-fluoroborate, 5,10,15,20-tetrakis-[4-(trimethylammonio)phenyl]-21H,23H-porphine tetra-triflate, meso-(N-methyl-X-pyridinium)$_n$-(phenyl)4-n-21H,23H-porphine tetra-p-tosylate, where n is the integer 0, 1, 2, or 3, and wherein X is 4-meso-tetrakis-[o-(N-methylnicotinamido)-phenyl]-21H,23H-porphine tetra-methyl sulfonate, 5,10,15,20-tetrakis-(2-sulfonatoethyl-4-pyridyl)-21H,23H-porphine chloride, 5,10,15,20-tetrakis-(carboxymethyl-4-pyridyl)-21H,23H-porphine chloride, 5,10,15,20-tetrakis-(carboxyethyl-4-pyridyl)-21H,23H-porphine chloride, 5,10,15,20-tetrakis-(carboxyethyl-4-pyridyl)-21H,23H-porphine bromide, 5,10,15,20-tetrakis-(carboxylate-4-pyridyl)-21H,23H-porphine, 2,3,7,8,12,13,17,18-octa-(2-hydroxyethyl)-21H-23H-porphine, 2,3,7,8,12,13,17,18-octa-(2-hydroxyethoxyethyl)-21H-23H-porphine, 2,3,7,8,12,13,17,18-octa-(2-aminoethyl)-21H-23H-porphine, and 2,3,7,8,12,13,17,18-octa-(2-hydroxyethoxypropyl)-21H-23H-porphine.

6. An ink in accordance with claim 1 wherein the absorption spectrum of the dye exhibits strong bands at from between about 380 and about 500 nanometers.

7. An ink in accordance with claim 1 wherein the absorption spectrum of the dye exhibits strong bands at from between about 380 and about 500 nanometers, and weaker bands at from between about 600 and about 800 nanometers.

8. An ink in accordance with claim 1 wherein the dye is present in an amount of about 0.001 to about 1 percent by weight, and the solution contains water in an amount of from about 75 to about 98 percent by weight.

9. An ink in accordance with claim 1 containing a humectant present in the amount of from about 2 to about 50 percent by weight.

10. An ink in accordance with claim 9 wherein the humectant is an aliphatic or aromatic glycol.

11. An ink in accordance with claim 9 wherein the humectant is a glycol selected from the group consisting of ethylene glycol, propylene glycol, diethylene glycol, and mixtures thereof.

12. An ink in accordance with claim 1 with a biocide present in the amount of from about 0.02 to about 0.1 percent by weight.

13. An ink in accordance with claim 1 wherein the dendrimer is a first, second or third generation dendrimer.

14. An ink in accordance with claim 1 wherein the dendrimer is a dendrimer of the first generation with an average diameter of about 10.8 Angstroms, and with 6 terminal amino groups.

15. An ink in accordance with claim 1 wherein the dendrimer is of the third generation with an average diameter of about 22 Angstroms, and with 24 terminal amino groups.

16. An ink in accordance with claim 1 wherein the dye is present in an amount of about 0.001 to about 1 percent by weight, the dendrimer is present in an amount of about 0.2 to about 15 percent by weight, and the solution contains water in an amount of from about 75 to about 98 percent by weight.

17. An ink in accordance with claim 1 wherein the dye is present in an amount of about 0.05 to about 0.5 percent by weight, the dendrimer is present in an amount of from about 0.01 to about 2 percent by weight, and the solution contains water in an amount of from about 96 to about 80 percent by weight.

18. An ink in accordance with claim 1 with a waterfastness of from between about 85 to about 99 percent.

* * * * *